US012621313B2

(12) United States Patent
Chandana et al.

(10) Patent No.: US 12,621,313 B2
(45) Date of Patent: May 5, 2026

(54) DETECTION OF MALICIOUS BEACONING IN VIRTUAL PRIVATE NETWORKS

(71) Applicant: Snowflake Inc., Bozeman, MT (US)

(72) Inventors: Sandeep Chandana, Fremont, CA (US); Aditya Kumar, Pune (IN); Ameya Mahesh Sanzgiri, Fremont, CA (US)

(73) Assignee: Snowflake Inc., Bozeman, MT (US)

( * ) Notice: Subject to any disclaimer, the term of this patent is extended or adjusted under 35 U.S.C. 154(b) by 328 days.

(21) Appl. No.: 18/308,437

(22) Filed: Apr. 27, 2023

(65) Prior Publication Data

US 2024/0364712 A1      Oct. 31, 2024

(51) Int. Cl.
     *H04L 9/40*          (2022.01)
     *H04L 41/16*       (2022.01)

(52) U.S. Cl.
     CPC .......... *H04L 63/1416* (2013.01); *H04L 41/16* (2013.01); *H04L 63/1433* (2013.01)

(58) Field of Classification Search
     CPC .. H04L 63/1416; H04L 63/1433; H04L 41/16
     See application file for complete search history.

(56) References Cited

U.S. PATENT DOCUMENTS

| | | | |
|---|---|---|---|
| 11,716,338 B2 * | 8/2023 | Elyashiv | .............. G06N 3/0475 726/23 |
| 2019/0114417 A1 * | 4/2019 | Subbarayan | ............ H04L 41/16 |
| 2022/0067146 A1 * | 3/2022 | Cai | ....................... G06F 21/566 |
| 2024/0244070 A1 * | 7/2024 | Mohapatra | .......... H04L 63/1425 |

* cited by examiner

*Primary Examiner* — Viet D Vu
(74) *Attorney, Agent, or Firm* — Schwegman Lundberg & Woessner, P.A.

(57) ABSTRACT

A computer-implemented method includes accessing virtual private cloud flow logs of network traffic data originating from a virtual private cloud, generating filtered flow logs by filtering the virtual private cloud flow logs, extracting features based on a plurality of attributes from the filtered flow logs, training one or more machine learning models based on the features, applying the one or more machine learning models to the network traffic data to identify potential beacons, generating an alert notification that identifies the potential beacons, and communicating the alert notification to an alerting system.

20 Claims, 12 Drawing Sheets

100

116

VIRTUAL PRIVATE CLOUD

DATABASE SYSTEM
108

110

DATABASE

DATABASE SERVICE MANAGER

EXECUTION PLATFORM
102

104

USER DEVICE

106

STORAGE PLATFORM

DATA STORAGE DEVICE
114-1

DATA STORAGE DEVICE
114-N

112

802 — ACCESS AND FILTER VPC FLOW LOGS

804 — EXTRACT FEATURES FROM FILTERED VPC FLOW LOGS

806 — TRAIN ML MODELS BASED ON THE EXTRACTED FEATURES

808 — MONITOR ML MODELS

810 — GENERATE ALERT NOTIFICATION BASED ON MONITORING

902 — GENERATE ALERT NOTIFICATION BASED ON MONITORING

904 — PROVIDE ALERT DATA TO MONITORING SYSTEM

906 — RECEIVE USER FEEDBACK FROM MONITORING SYSTEM

908 — ADJUST ML MODEL BASED ON USER FEEDBACK

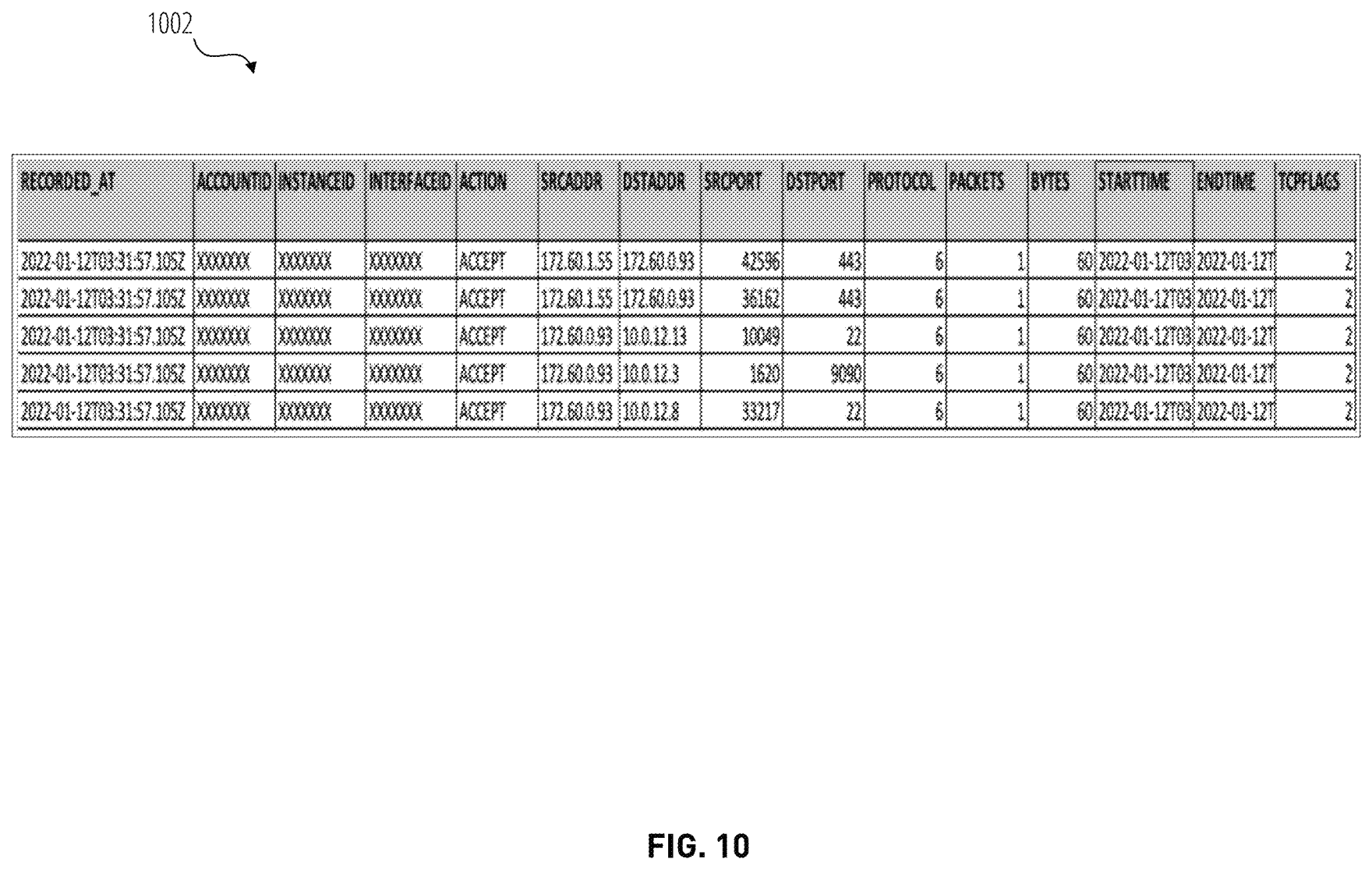

1002

| RECORDED_AT | ACCOUNTID | INSTANCEID | INTERFACEID | ACTION | SRCADDR | DSTADDR | SRCPORT | DSTPORT | PROTOCOL | PACKETS | BYTES | STARTTIME | ENDTIME | TCPFLAGS |
|---|---|---|---|---|---|---|---|---|---|---|---|---|---|---|
| 2022-01-12T03:31:57.105Z | XXXXXXX | XXXXXXX | XXXXXXX | ACCEPT | 172.80.1.55 | 172.80.0.93 | 45396 | 443 | 6 | 6 | 1 | 60 | 2022-01-12T03 | 2022-01-12T | 2 |
| 2022-01-12T03:31:57.105Z | XXXXXXX | XXXXXXX | XXXXXXX | ACCEPT | 172.80.1.55 | 172.80.0.93 | 38162 | 443 | 6 | 6 | 1 | 60 | 2022-01-12T03 | 2022-01-12T | 2 |
| 2022-01-12T03:31:57.105Z | XXXXXXX | XXXXXXX | XXXXXXX | ACCEPT | 172.80.0.93 | 10.0.12.13 | 10049 | 22 | 6 | 6 | 1 | 60 | 2022-01-12T03 | 2022-01-12T | 2 |
| 2022-01-12T03:31:57.105Z | XXXXXXX | XXXXXXX | XXXXXXX | ACCEPT | 172.80.0.93 | 10.0.12.3 | 1620 | 9090 | 6 | 6 | 1 | 60 | 2022-01-12T03 | 2022-01-12T | 2 |
| 2022-01-12T03:31:57.105Z | XXXXXXX | XXXXXXX | XXXXXXX | ACCEPT | 172.80.0.93 | 10.0.12.4 | 33217 | 22 | 6 | 6 | 1 | 60 | 2022-01-12T03 | 2022-01-12T | 2 |

FIG. 10

DETECTION OF MALICIOUS BEACONING IN VIRTUAL PRIVATE NETWORKS

TECHNICAL FIELD

The present disclosure generally relates to special-purpose machines that detects malicious beaconing activities in virtual private networks, and to the technologies by which such special-purpose machines become improved compared to other special-purpose machines for detecting beaconing activities.

BACKGROUND

New security and networking paradigms such as firewalls and Virtual Private Cloud (VPC) prevents malware from directly communicating with attackers/adversaries. To overcome this, the attackers create a command-and-control server (C2 server) that can send commands to infected endpoints. When an endpoint is infected, it tries to establish an outbound connection to the attacker's C2 server over the internet. Usually, this connection will try to look like normal traffic by using HTTP, HTTPS or DNS. The purpose of the connection is to notify the C2 server that a new infected endpoint is ready and waiting for instructions. This process will then pause for some time before repeating the check in process again. This activity is referred to as malicious beaconing activity and is often a sign of more planned and widespread network attacks on organizational infrastructure.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 10 is a table illustrating alert data in accordance with one example embodiment.

DETAILED DESCRIPTION

Figure 1:
FIG. 1 illustrates an example computing environment that includes a network-based database system in communication with a cloud storage provider system, in accordance with some embodiments of the present disclosure.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Databases are widely used for data storage and access in computing applications. Databases may include one or more tables that include or reference data that can be read, modified, or deleted using queries. Querying very large databases and/or tables might require scanning large amounts of data. Reducing the amount of data scanned is one of the main challenges of data organization and processing.

The term "micro-partition" is used herein to refer to a contiguous unit of storage that stores some or all of the data of a single table. In some example embodiments, each micro-partition stores between 50 and 500 MB of uncompressed data. Micro-partitions may be stored in a compressed or uncompressed form. Groups of rows in tables may be mapped into individual micro-partitions organized in a columnar fashion. In relational databases comprising rows and columns, all columns for the rows of a micro-partition are stored in the micro-partition. Some large tables are stored in millions or hundreds of millions of micro-partitions. The set of micro-partitions to scan in executing a query may be referred to herein as a "scan set."

In some example embodiments, a micro-partition is a file in a file system. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure.

The term "virtual private cloud" (VPC) is used herein to refer to an on-demand configurable pool of shared resources allocated within a public cloud environment, providing a certain level of isolation between the different organizations using the resources. A VPC allows for creating a private space within the public cloud's architecture, and connects it to on-premises network using a VPN function. A VPC also enables launching and managing cloud resources such as virtual machines, storage, and networking in one's own virtual network. As such, a VPC is a cloud service that provides a secure and isolated network environment for users to run their applications and resources. However, VPCs can be susceptible to malicious beacons, which are periodic communications from malware installed on compromised hosts to the attacker's command and control (C2) server. Malicious beacons can allow attackers to get further instructions, exfiltrate data, or perform other malicious actions on the victim's cloud infrastructure.

Malicious beacons can evade detection by using common protocols and services, such as HTTP/S, DNS, SSH, or Google, Twitter, Dropbox, etc., to blend in with normal network traffic. They can also vary their timing and packet size to avoid statistical analysis. Malicious beacons can be part of a supply chain attack, where attackers compromise a software provider's pipeline and inject malicious code into the software packages that are distributed to downstream customers. This way, attackers can infect multiple VPCs with malware that communicates back to their C2 server.

To prevent or detect malicious beacons in VPCs, the present application describes a system for detecting malicious beacon activities in VPCs by monitoring and auditing network traffic and cloud activity and using machine learning (ML) model threat intelligence and anomaly detection tools. Once an instance involved in the beaconing activity is detected, the activity is isolated, and its outbound communication is terminated. Details of communication endpoints are forwarded to a threat investigating team for further investigation. Based on the feedback from the threat investigating team, those instances are separated from training the ML model.

In one example, the ML model can be trained unsupervised for each VPC, account, and resource. The malicious beacon detection system also leverages statistical features of simulated and known beacons to detect potentially malicious beaconing activity in the incoming VPC flow logs. Data generated through the threat investigating team are also leveraged for feature extraction and training purposes. The dynamic set of features provide a way to filter the new VPC flow logs and those filters are updated in real-time which makes the system learn for new type of beaconing activity happening in the VPC as new types of beacons are introduced in the system.

For other anomalies, the ML model provides an explanation of why they are considered anomalous. This can help identify the factors or behaviors that make them stand out and assist other teams in investigating and improving the network security with rules. Anomalies are ranked based on the occurrence in past and a time decay weighing factor can be applied.

In one aspect, a computer-implemented method includes accessing virtual private cloud flow logs of network traffic data originating from a virtual private cloud, generating filtered flow logs by filtering the virtual private cloud flow logs, extracting features based on a plurality of attributes from the filtered flow logs, training one or more machine learning models based on the features, applying the one or more machine learning models to the network traffic data to identify potential beacons, generating an alert notification that identifies the potential beacons, and communicating the alert notification to an alerting system.

As a result, one or more of the methodologies described herein facilitate solving the technical problem of detecting malicious beacons in virtual private cloud. As such, one or more of the methodologies described herein may obviate a need for certain efforts or computing resources that otherwise would be involved in monitoring and auditing network traffic and cloud activity. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 illustrates an example computing environment 100 that includes a database system 104 in communication with a storage platform 112, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the computing environment 100 comprises the database system 104 and a storage platform 112 (e.g., AWS®, Microsoft Azure Blob Storage®, or Google Cloud Storage®). The database system 104 is used for reporting and analysis of integrated data from one or more disparate sources including data storage device 114-1 to data storage device 114-N within the storage platform 112. The storage platform 112 comprises a plurality of computing machines and provides on-demand computer system resources such as data storage and computing power to the database system 104. The virtual private cloud 116 includes the database system 104 and the storage platform 112.

The database system 104 comprises a database service manager 108, an execution platform 102, and a database 110. The database system 104 hosts and provides data reporting and analysis services to multiple client accounts. Administrative users can create and manage identities (e.g., users, roles, and groups) and use permissions to allow or deny access to the identities to resources and services.

The database service manager 108 coordinates and manages operations of the database system 104. The database service manager 108 also performs query optimization and compilation as well as managing clusters of compute services that provide compute resources (also referred to as "virtual warehouses"). The database service manager 108 can support any number of client accounts such as end users providing data storage and retrieval requests, system administrators managing the systems and methods described herein, and other components/devices that interact with the database service manager 108.

The database service manager 108 is also in communication with a user device 106. The user device 106 corresponds to a user of one of the multiple client accounts supported by the database system 104. In some embodiments, the database service manager 108 does not receive any direct communications from the user device 106 and only receives communications concerning jobs from a queue within the database system 104.

The database service manager 108 is also coupled to database 110, which is associated with the data stored in the computing environment 100. The database 110 stores data pertaining to various functions and aspects associated with the database system 104 and its users. In some embodiments, the database 110 includes a summary of data stored in remote data storage systems as well as data available from a local cache. Additionally, the database 110 may include information regarding how data is organized in remote data storage systems (e.g., storage platform 112) and the local caches. The database 110 allows systems and services to determine whether a piece of data needs to be accessed without loading or accessing the actual data from a storage device.

In some embodiments, the database service manager 108 may determine that a job should be performed based on data from the database 110. In such embodiments, the database service manager 108 may scan the data and determine that a job should be performed to improve data organization or database performance.

The database service manager 108 is further coupled to the execution platform 102, which provides multiple computing resources that execute various data storage and data retrieval tasks. The execution platform 102 is coupled to the storage platform 112. The storage platform 112 comprises multiple data storage devices 114-1 to 114-N. In some embodiments, the data storage devices 114-1 to 114-N are cloud-based storage devices located in one or more geographic locations. For example, the data storage devices 114-1 to 114-N may be part of a public cloud infrastructure or a private cloud infrastructure. The data storage devices 114-1 to 114-N may be hard disk drives (HDDs), solid state drives (SSDs), storage clusters, Amazon S3™ storage systems or any other data storage technology. Additionally, the storage platform 112 may include distributed file systems (e.g., Hadoop Distributed File Systems (HDFS)), object storage systems, and the like.

The execution platform 102 comprises a plurality of compute nodes. A set of processes on a compute node executes a query plan compiled by the database service manager 108. The set of processes can include: a first process to execute the query plan; a second process to monitor and delete micro-partition files using a least recently used (LRU) policy and implement an out of memory (OOM) error mitigation process; a third process that extracts health information from process logs and status to send back to the database service manager 108; a fourth process to establish communication with the database service manager 108 after a system boot; and a fifth process to handle all communication with a compute cluster for a given job provided by the database service manager 108 and to communicate information back to the database service manager 108 and other compute nodes of the execution platform 102.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 114-1 to 114-N are decoupled from the computing resources associated with the execution platform 102. This architecture supports dynamic changes to the database system 104 based on the changing data storage/retrieval needs as well as the changing needs of the users and systems. The support of dynamic changes allows the database system 104 to scale quickly in response to changing demands on the systems and components within the database system 104. The decoupling of the computing resources from the data storage devices

114-1 to 114-N supports the storage of large amounts of data without requiring a corresponding large amount of computing resources. Similarly, this decoupling of resources supports a significant increase in the computing resources utilized at a particular time without requiring a corresponding increase in the available data storage resources.

The database service manager 108, the database 110, the execution platform 102, and the storage platform 112 are shown in FIG. 1 as individual discrete components. However, each of the database service manager 108, the database 110, the execution platform 102, and the storage platform 112 may be implemented as a distributed system (e.g., distributed across multiple systems/platforms at multiple geographic locations). Additionally, each of the database service manager 108, the database 110, the execution platform 102, and the storage platform 112 can be scaled up or down (independently of one another) depending on changes to the requests received and the changing needs of the database system 104. Thus, in the described embodiments, the database system 104 is dynamic and supports regular changes to meet the current data processing needs.

During typical operation, the database system 104 processes multiple jobs determined by the database service manager 108. These jobs are scheduled and managed by the database service manager 108 to determine when and how to execute the job. For example, the database service manager 108 may divide the job into multiple discrete tasks and may determine what data is needed to execute each of the multiple discrete tasks. The database service manager 108 may assign each of the multiple discrete tasks to one or more nodes of the execution platform 102 to process the task. The database service manager 108 may determine what data is needed to process a task and further determine which nodes within the execution platform 102 are best suited to process the task. Some nodes may have already cached the data needed to process the task and, therefore, be a good candidate for processing the task.

Metadata stored in the database 110 assists the database service manager 108 in optimizing user queries by determining which nodes in the execution platform 102 have already cached at least a portion of the data needed to process the task. In some embodiments, metadata includes a summary of data stored in remote data storage systems as well as data available from a local cache (e.g., a cache within one or more of the clusters of the execution platform 102). Additionally, metadata may include information regarding how data is organized in the remote data storage systems and the local caches. Metadata allows systems and services to determine whether a piece of data needs to be processed without loading or accessing the actual data from a storage device.

One or more nodes in the execution platform 102 process the task using data cached by the nodes and, if necessary, data retrieved from the storage platform 112. It is desirable to retrieve as much data as possible from caches within the execution platform 102 because the retrieval speed is typically much faster than retrieving data from the storage platform 112.

As shown in FIG. 1, the computing environment 100 separates the execution platform 102 from the storage platform 112. In this arrangement, the processing resources and cache resources in the execution platform 102 operate independently of the data storage devices 114-1 to 114-N in the storage platform 112. Thus, the computing resources and cache resources are not restricted to specific data storage devices 114-1 to 114-N. Instead, all computing resources and all cache resources may retrieve data from, and store data to, any of the data storage resources in the storage platform 112.

Figure 2:
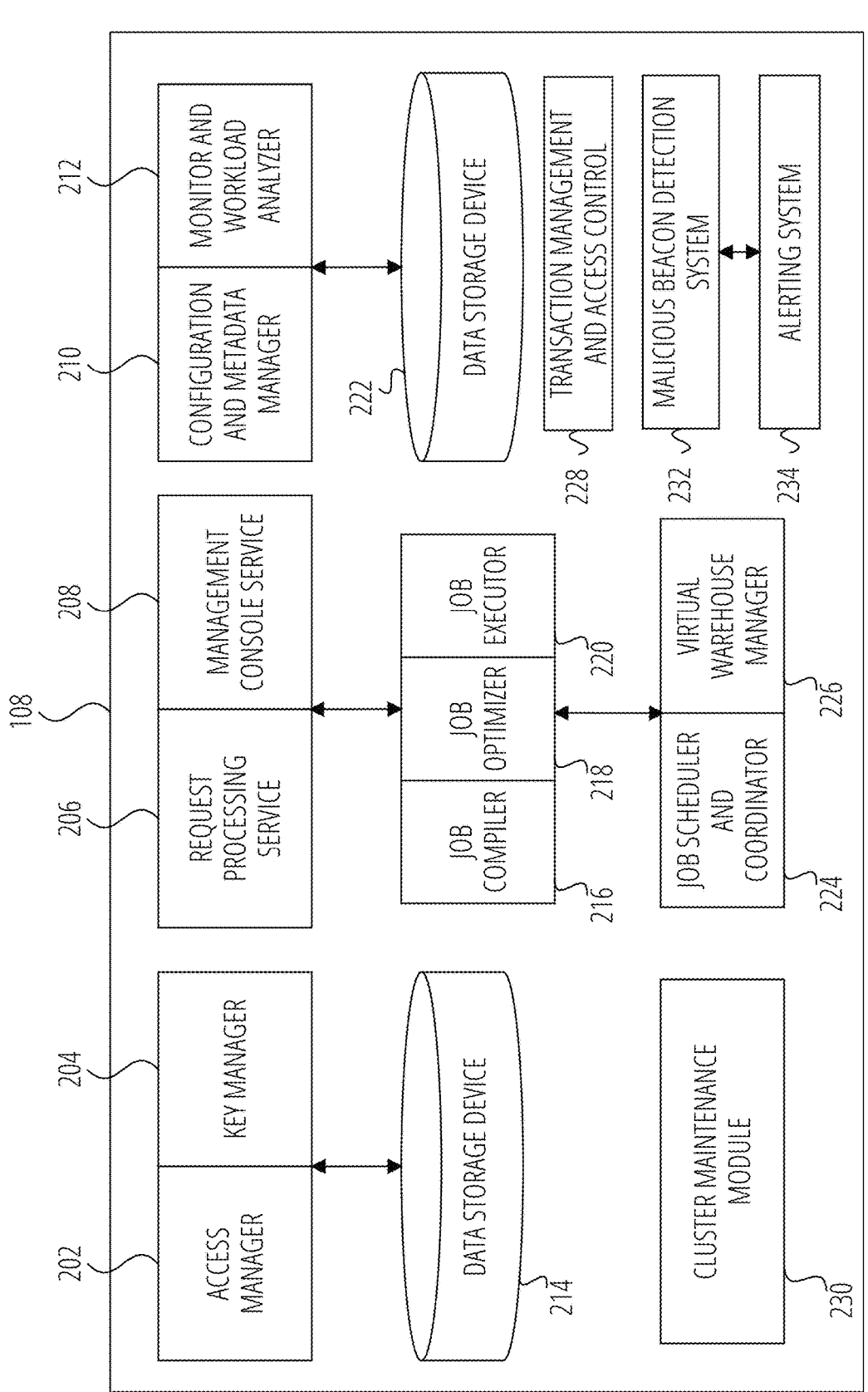
FIG. 2 is a block diagram illustrating components of a compute service manager, in accordance with some embodiments of the present disclosure.

FIG. 2 is a block diagram illustrating components of the database service manager 108, in accordance with some embodiments of the present disclosure. As shown in FIG. 2, the database service manager 108 includes an access manager 202, a key manager 204, a request processing service 206, a management console service 208, a configuration and metadata manager 210, a monitor and workload analyzer 212, a data storage device 214, a job compiler 216, a job optimizer 218, a job executor 220, a data storage device 222, a job scheduler and coordinator 224, a virtual warehouse manager 226, a transaction management and access control 228, and a cluster maintenance module 230.

The access manager 202 and the key manager 204 coupled to the data storage device 214. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices 114-1 to 114-N in storage platform 112). As used herein, the remote storage devices may also be referred to as "persistent storage devices" or "shared storage devices."

The request processing service 206 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 102 or in a data storage device in storage platform 112.

The management console service 208 supports access to various systems and processes by administrators and other system managers. Additionally, the management console service 210 may receive a request to execute a job and monitor the workload on the system.

The job compiler 216 parses a job into multiple discrete tasks and generates the execution code for each of the multiple discrete tasks. The job optimizer 218 determines the best method to execute the multiple discrete tasks based on the data that needs to be processed. The job optimizer 218 also handles various data pruning operations and other data optimization techniques to improve the speed and efficiency of executing the job. The job executor 220 executes the execution code for jobs received from a queue or determined by the database service manager 108.

The job scheduler and coordinator 224 sends received jobs to the appropriate services or systems for compilation, optimization, and dispatch to the execution platform 102. For example, jobs may be prioritized and processed in that prioritized order. In an embodiment, the job scheduler and coordinator 224 determines a priority for internal jobs that are scheduled by the database service manager 108 with other "outside" jobs such as user queries that may be scheduled by other systems in the database but may utilize the same processing resources in the execution platform 102. In some embodiments, the job scheduler and coordinator 224 identifies or assigns particular nodes in the execution platform 102 to process particular tasks.

The virtual warehouse manager 226 manages the operation of multiple virtual warehouses implemented in the execution platform 102. As discussed below, each virtual warehouse includes multiple execution nodes that each include a cache and a processor.

The configuration and metadata manager 210 manages the information related to the data stored in the remote data storage devices and in the local caches (e.g., the caches in execution platform 102). In one example, the configuration and metadata manager 210 uses the metadata to determine which data micro-partitions need to be accessed to retrieve data for processing a particular task or job.

The monitor and workload analyzer 212 oversees processes performed by the database service manager 108 and manages the distribution of tasks (e.g., workload) across the virtual warehouses and execution nodes in the execution platform 102. The monitor and workload analyzer 212 also redistributes tasks, as needed, based on changing workloads throughout the database system 104 and may further redistribute tasks based on a user (e.g., "external") query workload that may also be processed by the execution platform 102. The configuration and metadata manager 210 and monitor and workload analyzer 212 are coupled to the data storage device 222. The data storage device 222 and the data storage device 214 represent any data storage device within the database system 104. For example, data storage device 222 and the data storage device 214 may represent caches in execution platform 102, storage devices in storage platform 112, or any other storage device.

The transaction management and access control 228 manages the various tasks and other activities associated with the processing of data storage requests and data access requests. For example, the transaction management and access control 228 provides consistent and synchronized access to data by multiple users or systems. Since multiple users/systems may access the same data simultaneously, changes to the data may be synchronized to ensure that each user/system is working with the current version of the data. The transaction management and access control 228 provides control of various data processing activities at a single, centralized location in database service manager 108.

The cluster maintenance module 230 manages the clustering and ordering of partitions of a table. The cluster maintenance module 230 may partition each table in a database into one or more partitions or micro-partitions. The cluster maintenance module 230 may not require or achieve ideal clustering for the table data but may maintain "good enough" or approximate clustering. For example, ideal clustering on a specific attribute may result in each partition either having non-overlapping value ranges or having only a single value for the specific attribute. Because the cluster maintenance module 230 does not require perfect clustering, significant processing and memory resources may be conserved during data loading or DML command operations.

At least some embodiments may manage the ordering or clustering of a table using micro-partitions. As mentioned previously, traditional data warehouses rely on static partitioning of large tables to achieve acceptable performance and enable better scaling. In these systems, a partition is a unit of management that is manipulated independently using specialized data definition language (DDL) and syntax. However, static partitioning has a number of well-known limitations, such as maintenance overhead and data skew, which can result in disproportionately-sized partitions. Embodiments disclosed herein may implement a powerful and unique form of partitioning, called micro-partitioning, that delivers all the advantages of static partitioning without the known limitations, as well as providing additional significant benefits.

In one embodiment, all data in tables is automatically divided into micro-partitions, which are contiguous units of storage. By way of example, each micro-partition may contain between 50 MB and 500 MB of uncompressed data (note that the actual size in storage may be smaller because data may be stored compressed). Groups of rows in tables are mapped into individual micro-partitions, organized in a columnar fashion. This size and structure allows for extremely granular pruning of very large tables, which can be comprised of millions, or even hundreds of millions, of micro-partitions. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

The malicious beacon detection system 232 accesses VPC data flow logs and detects malicious beacon activities by using a trained unsupervised machine learning model. The machine learning model is trained based on features extracted from the VPC data flow logs. The malicious beacon detection system 232 communicates an alert to the alerting system 234.

The alerting system 234 receives the alert that identifies suspicious beacon activities. Users review the suspicious beacon activities and confirm whether the suspicious beacon activities are indeed malicious. The alerting system 234 provides user feedback to the malicious beacon detection system 232 to retrain the ML model.

Figure 3:
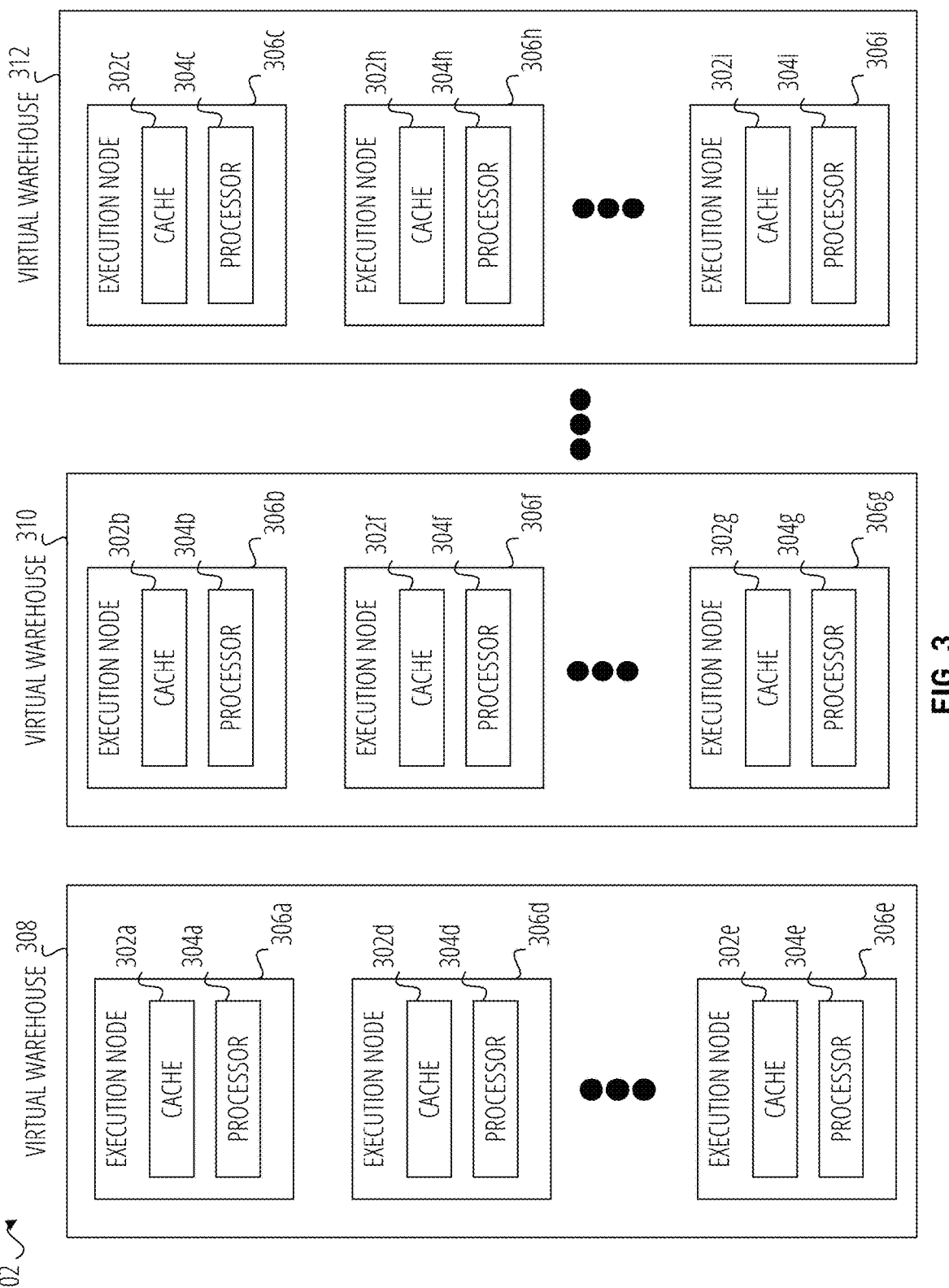
FIG. 3 is a block diagram illustrating components of an execution platform, in accordance with some embodiments of the present disclosure.

FIG. 3 is a block diagram illustrating components of the execution platform 102, in accordance with some embodiments of the present disclosure. As shown in FIG. 3, the execution platform 102 includes multiple virtual warehouses, including virtual warehouse 308, virtual warehouse 310, virtual warehouse 312. Each virtual warehouse includes multiple execution nodes that each includes a data cache and a processor. The virtual warehouses can execute multiple tasks in parallel by using the multiple execution nodes. As discussed herein, the execution platform 102 can add new virtual warehouses and drop existing virtual warehouses in real-time based on the current processing needs of the systems and users. This flexibility allows the execution platform 102 to quickly deploy large amounts of computing resources when needed without being forced to continue paying for those computing resources when they are no longer needed. All virtual warehouses can access data from any data storage device (e.g., any storage device in storage platform 112).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 114-1 to 114-N shown in FIG. 1. Thus, the virtual warehouses are not necessarily assigned to a specific data storage devices 114-1 to 114-N and, instead, can access data from any of the data storage devices 114-1 to 114-N within the storage platform 104. Similarly, each of the execution nodes shown in FIG. 3 can access data from any of the data storage devices 114-1 to 114-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 308 includes three execution nodes (execution node 306a, 306d, 306e). The execution node 306a includes a cache 302a and a processor 304a. Execution node 306d includes a cache 302d and a processor 304d. Execution node 306e includes a cache 302e and a processor 304e.

Each execution node 306a, 306d, 306e is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 308 discussed above, virtual warehouse 310 includes three execution nodes (execution node 306b, 306f, 306g). Execution node 306b includes a cache 302b and a processor 304b. Execution node 306f includes a cache 302f and a processor 304f. Execution node 306g includes a cache 302g and a processor 304g.

Similar to virtual warehouse 308 and virtual warehouse 310 discussed above, virtual warehouse 312 includes three execution nodes (execution node 306c, 306h, 306i). Execution node 306c includes a cache 302c and a processor 304c. Execution node 306f includes a cache 302f and a processor 304f. Execution node 306g includes a cache 302g and a processor 304g.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 112. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the storage platform 112.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouse 308, 310, and 312 are associated with the same execution platform 102, the virtual warehouses may be implemented using multiple computing systems at multiple geographic locations. For example, virtual warehouse 308 can be implemented by a computing system at a first geographic location, while virtual warehouse 310 and virtual warehouse 312 are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 308 implements execution node 306a and 306d on one computing platform at a geographic location and implements execution node 306e at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 102 is also fault tolerant. For example, if one virtual warehouse fails, that virtual warehouse is quickly replaced with a different virtual warehouse at a different geographic location.

A particular execution platform 102 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 112, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
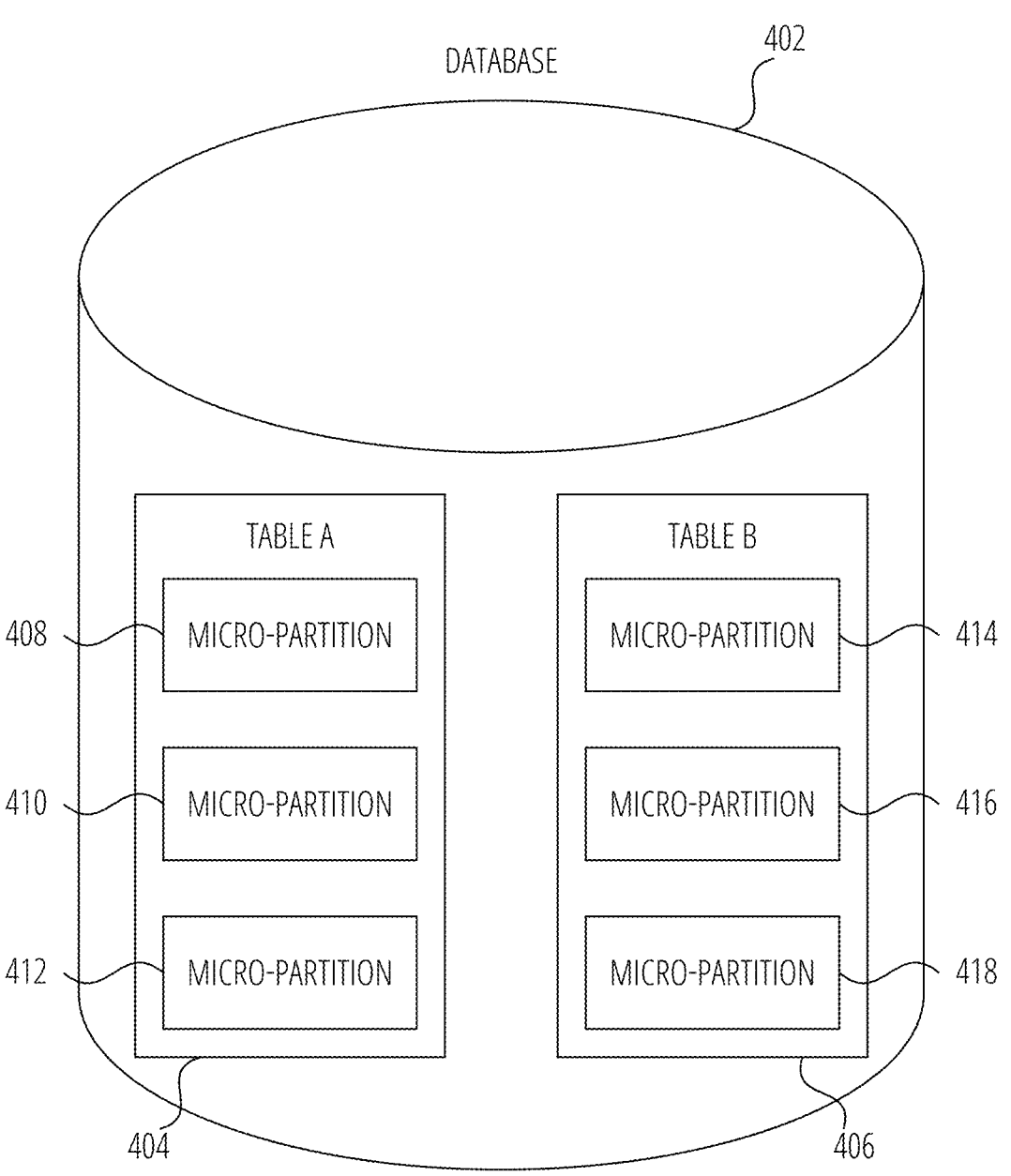
FIG. 4 is a block diagram illustrating storage of database tables in micro-partitions, according to some example embodiments.

FIG. 4 is a block diagram of a database 402 illustrating storage of database tables in micro-partitions, according to some example embodiments. The database 402 includes table A 404 and table B 406. The table A 404 is stored in micro-partitions 408, 410, and 412. The table B 406 is stored in micro-partitions 414, 416, and 418. Each micro-partition may be implemented as a file in a file system.

Each of the micro-partitions 408-418 may be compressed or uncompressed. Furthermore, each of the compressed micro-partitions may be compressed using a different compression algorithm. Thus, the micro-partition 408 may have a first column stored using dictionary compression, the micro-partition 410 may be stored uncompressed, and the micro-partition 412 may store a second column using dictionary compression. Similarly, the micro-partition 414 may have a first column stored using dictionary compression, the micro-partition 416 may have the first column and a second column stored using dictionary compression, and the micro-partition 418 may be stored using run-length encoding for the same or different columns.

Figure 5:
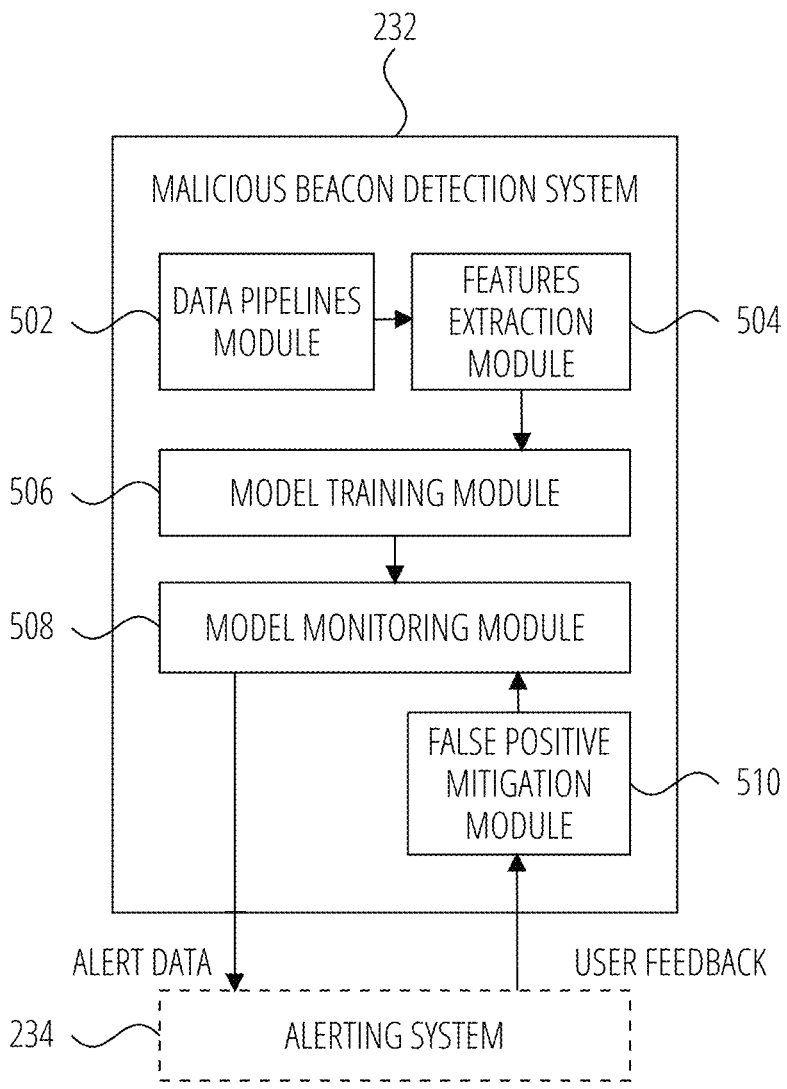
FIG. 5 is a block diagram illustrating a malicious beacon detection system in accordance with one example embodiment.

FIG. 5 is a block diagram illustrating a malicious beacon detection system 232 in accordance with one example embodiment. The malicious beacon detection system 232 includes a data pipelines module 502, a features extraction module 504, a model training module 506, and a model monitoring module 508.

The data pipelines module 502 accesses VPC flow logs. VPC flow logs are a feature that allows capturing and recording information about the IP traffic going to and from network interfaces in VPC. VPC flow logs can be used for network monitoring, troubleshooting, security analysis, and cost optimization. VPC flow logs can be enabled for a VPC, a subnet, or a network interface. The data pipelines module 502 enables a user to specify the type of traffic to capture (accepted, rejected, or all) and the destination where the user wants to publish the flow log data.

An example of flow log data consists of log events that describe the traffic flow, such as source and destination IP addresses, ports, protocol number, packet and byte counts, time interval, and action (accept or reject). The user can access and view the flow log data in the log group, bucket, or delivery stream that the user configures.

The features extraction module 504 extracts features from VPC logs by extracting meaningful information from the raw log data that captures the IP traffic going to and from network interfaces in the VPC (e.g., database system 104).

Examples of features that can be extracted from VPC logs include:

Communication Duration

Time between communication

Data size/Bytes Transferred

Number of Packets

Source and destination IP addresses, ports, and protocols

Instance ID, subnet ID, VPC ID, and AWS service name

Traffic volume, direction, and path

To extract features from VPC logs, you need to:

Enable VPC flow logs for your VPC, subnet, or network interface

Specify the type of traffic to capture and the destination to publish the flow log data Create a table or schema for the flow log data in your analytical tool Query the flow log data using SQL or other methods Filter, aggregate, and visualize the extracted features In one example, the features extraction module 504 identifies 2-day features (as baseline) and 1 hr features.

Figure 7:
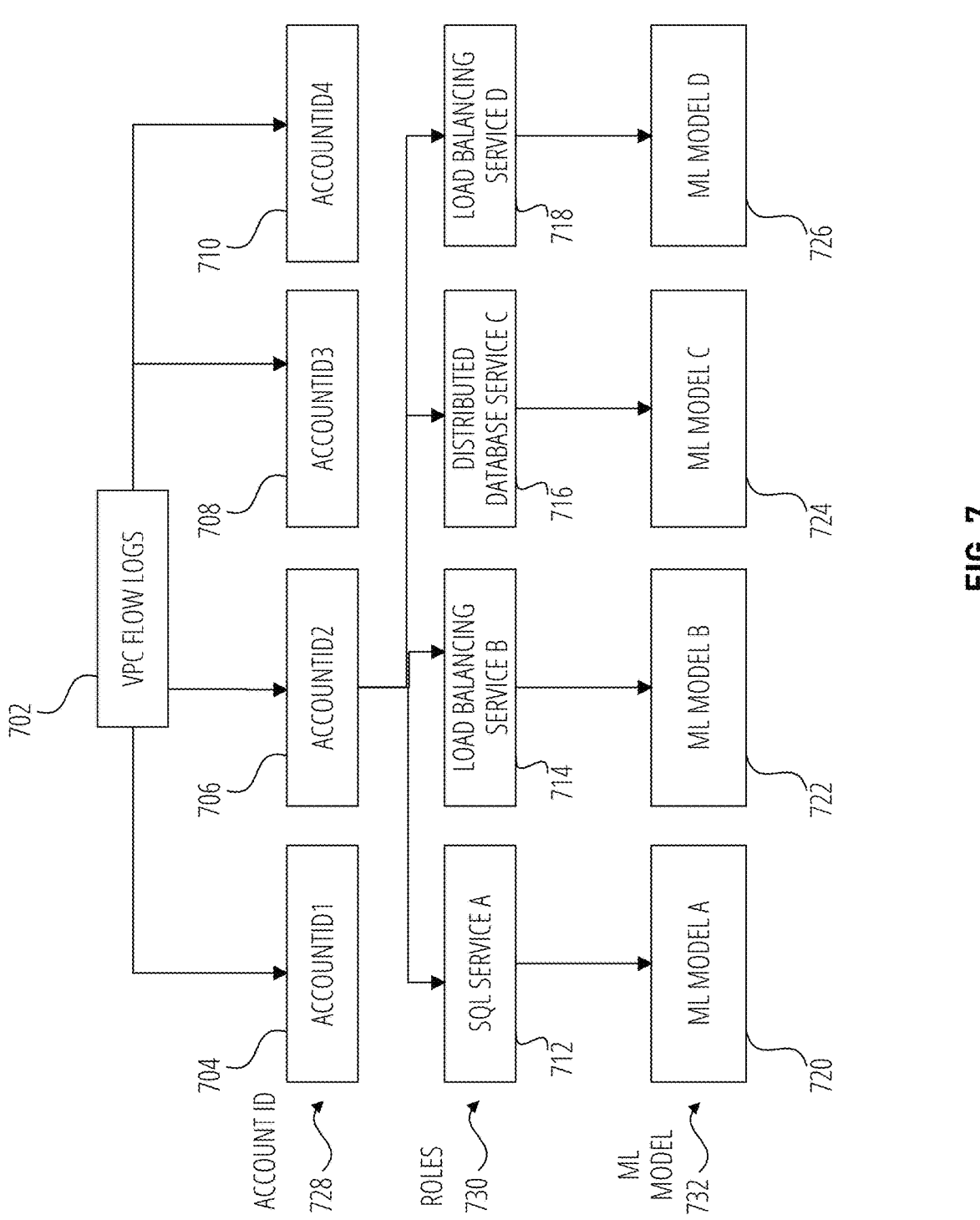
FIG. 7 is a block diagram illustrating a machine learning model structure in accordance with one embodiment.

The model training module 506 trains a machine learning model based on the features extracted from the features extraction module 504. For example, the model training module 506 prepares the data for training by splitting it into training, validation, and test sets, and applying any necessary preprocessing steps (such as normalization, encoding, etc.). The model training module 506 then trains the machine learning model using the features extracted from the VPC flow log data as input and the desired output as labels (such as incident classification, anomaly detection, etc.). Examples of ML candidate models include isolating an outlier, vector profile (e.g., a system such as Macbeth mimics malicious beaconing activity and can be used to establish a benchmark of models in real-time and create a vector profile of malicious beacons), cosine similarity with VPC flow logs, enclosing inliers, auto encoders. The model training module 506 generates a final model based on account, roles, and services. An example of a final model is illustrated in FIG. 7. The ML model can then be evaluated using metrics such as accuracy, precision, recall, F1-score, etc. on the test set.

The model monitoring module 508 deploys the ML model to an endpoint or a service that can consume the VPC flow log data and make predictions based on the trained ML model. For example, the ML model can be used to analyze VPC logs to help:

Classify whether a log event or a set of events indicates a real incident that requires attention Identify anomalies or outliers in the log data that may signal potential issues or threats Filter and aggregate the log data to derive meaningful insights and patterns Optimize network performance, security, and cost based on the log analysis The model monitoring module 508 generates alert data that identifies suspected or potential malicious beacon activities in the VPC flow logs. The alert data identifies an alert score. The following formula illustrates an example calculation of the alert score:

$$\text{Score} = \alpha * \sum(\text{hourly\_detection\_score}) + \beta * \sum(\text{historical\_score})$$

Thresholds $\alpha$ and $\beta$ are tunable parameters and can be configured as a fixed values or values of these parameters can come through baseline ranking function or historical weighting function. Hourly_detection_score and historical_score are scoring mechanisms where score for anomalies can be calculated based on either one or combination of frequency of occurrence, anomaly score provided by ML model or any other measure.

The model monitoring module 508 communicates the alert data to the alerting system 234. The false positive mitigation module 510 receives user feedback from the alerting system 234. The user feedback confirms whether the suspected malicious beacons are anomalies or whether they are false positives. The false positive mitigation module 510 communicates the user feedback to the model monitoring module 508. The model training module 506 retrains the model based on the user feedback.

Figure 6:
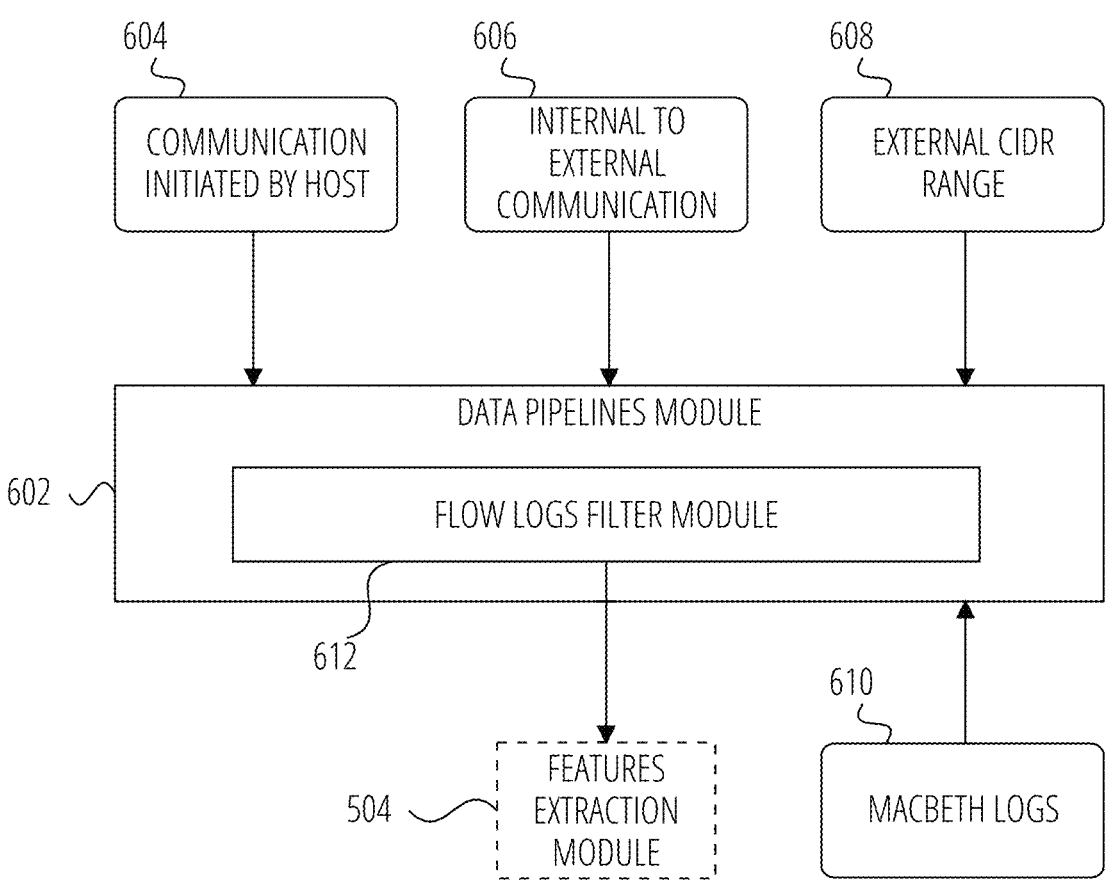
FIG. 6 is a block diagram illustrating a data pipelines module in accordance with one example embodiment.

FIG. 6 is a block diagram illustrating a data pipelines module in accordance with one example embodiment. The data pipelines module 602 includes a flow logs filter module 612. The flow logs filter module 612 receives flow logs from several sources: communication initiated by host 604, internal to external communication 606, external CIDR range 608 (e.g., IPs that are not trusted) and Macbeth logs 610 (e.g., regularly beacon back to HTTP endpoint with interval, jitter, and volume attributes). The flow logs filter module 612 filters the VPC flow logs and provides the filtered VPC flow logs to the features extraction module 504.

FIG. 7 is a block diagram illustrating a machine learning model structure in accordance with one embodiment. The VPC flow logs 702 is filtered by account ID 728 (e.g., AccountID1 704, AccountID2 706, AccountID3 708, AccountID4 710). VPC flow logs for each account ID are filtered by roles 730 (e.g., SQL service A 712, load balancing service B 714, distributed database service C 716, load balancing service D 718). A ML model 732 corresponding to each role is generated (e.g., ML model a 720, ML model b 722, ML model c 724, ML model d 726). In another example, an account machine learning model is trained for each account, a cohort/group of accounts (e.g., accounts 728), or within a particular VPC. A resource machine learning model is trained for each resource (e.g., roles 730).

Figure 8:
FIG. 8 is a flow diagram illustrating a method for training a machine learning model in accordance with one example embodiment.
Figure 8:
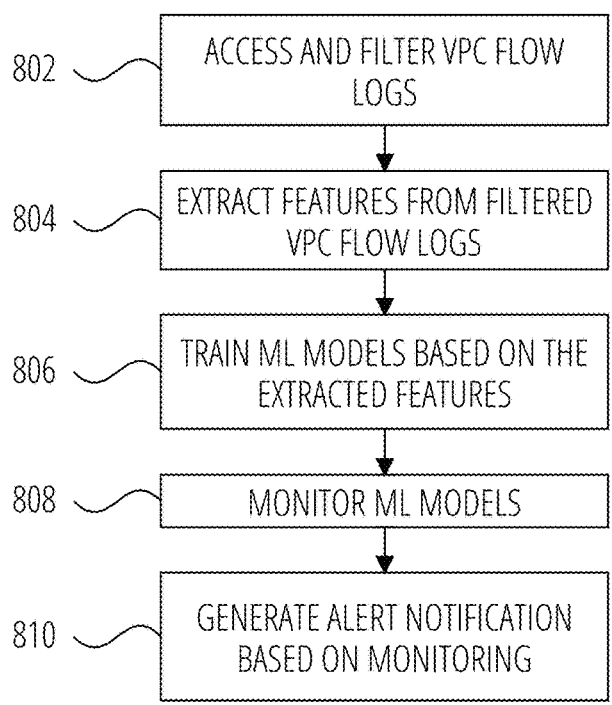

FIG. 8 illustrates an example method 800 for operating the malicious beacon detection system 232 in accordance with one example embodiment. Although the example method 800 depicts a particular sequence of operations, the sequence may be altered without departing from the scope of the present disclosure. For example, some of the operations depicted may be performed in parallel or in a different sequence that does not materially affect the function of the method 800. In other examples, different components of an example device or system that implements the method 800 may perform functions at substantially the same time or in a specific sequence.

According to some examples, the method includes accessing and filter VPC flow logs at block 802. In one example embodiment, the data pipelines module 502 accesses and filters the VPC flow logs.

According to some examples, the method includes extracting features from filtered VPC flow logs at block 804. In one example embodiment, the features extraction module 504 extracts features from the filtered VPC flow logs.

According to some examples, the method includes training ML models based on the extracted features at block 806. In one example embodiment, the model training module 506 trains the ML models.

According to some examples, the method includes monitoring ML models at block 808. In one example embodiment, the model monitoring module 508 monitors the ML models.

According to some examples, the method includes generating alert notification based on monitoring at block 810. In one example embodiment, the model monitoring module 508 generates the alert notification.

Figure 9:
FIG. 9 is a flow diagram illustrating a method for providing alert data to a monitoring system in accordance with one example embodiment.
Figure 9:
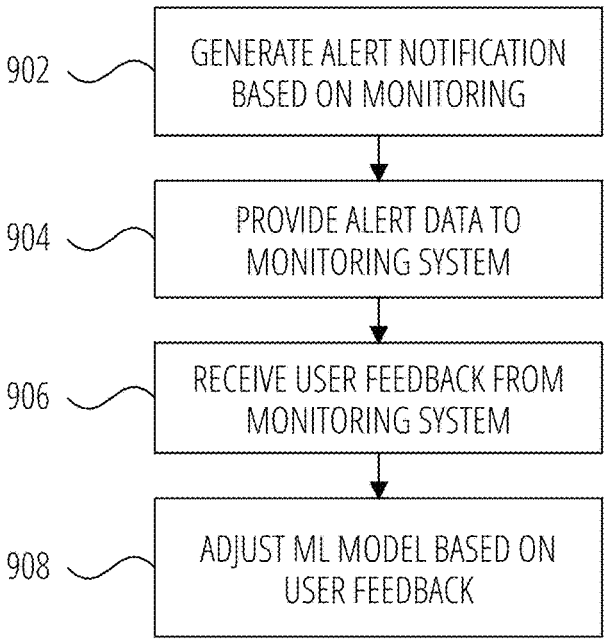

FIG. 9 illustrates an example method 900 for operating the malicious beacon detection system 232 in accordance with one example embodiment. Although the example method 900 depicts a particular sequence of operations, the sequence may be altered without departing from the scope of the present disclosure. For example, some of the operations depicted may be performed in parallel or in a different sequence that does not materially affect the function of the method 900. In other examples, different components of an example device or system that implements the method 900 may perform functions at substantially the same time or in a specific sequence.

According to some examples, the method includes generating alert notification based on monitoring at block 902. In one example embodiment, the model monitoring module 508 performs the operation of block 902.

According to some examples, the method includes providing alert data to monitoring system at block 904. In one example embodiment, the model monitoring module 508 performs the operation of block 902.

According to some examples, the method includes receiving user feedback from monitoring system at block 906. In one example embodiment, the false positive mitigation module 510 performs the operation of block 906.

According to some examples, the method includes adjusting ML model based on user feedback at block 908. In one example embodiment, the model training module 506/model monitoring module 508 performs the operation of 908.

FIG. 10 is a data feature table 1002 illustrating alert data in accordance with one example embodiment.

Figure 11:
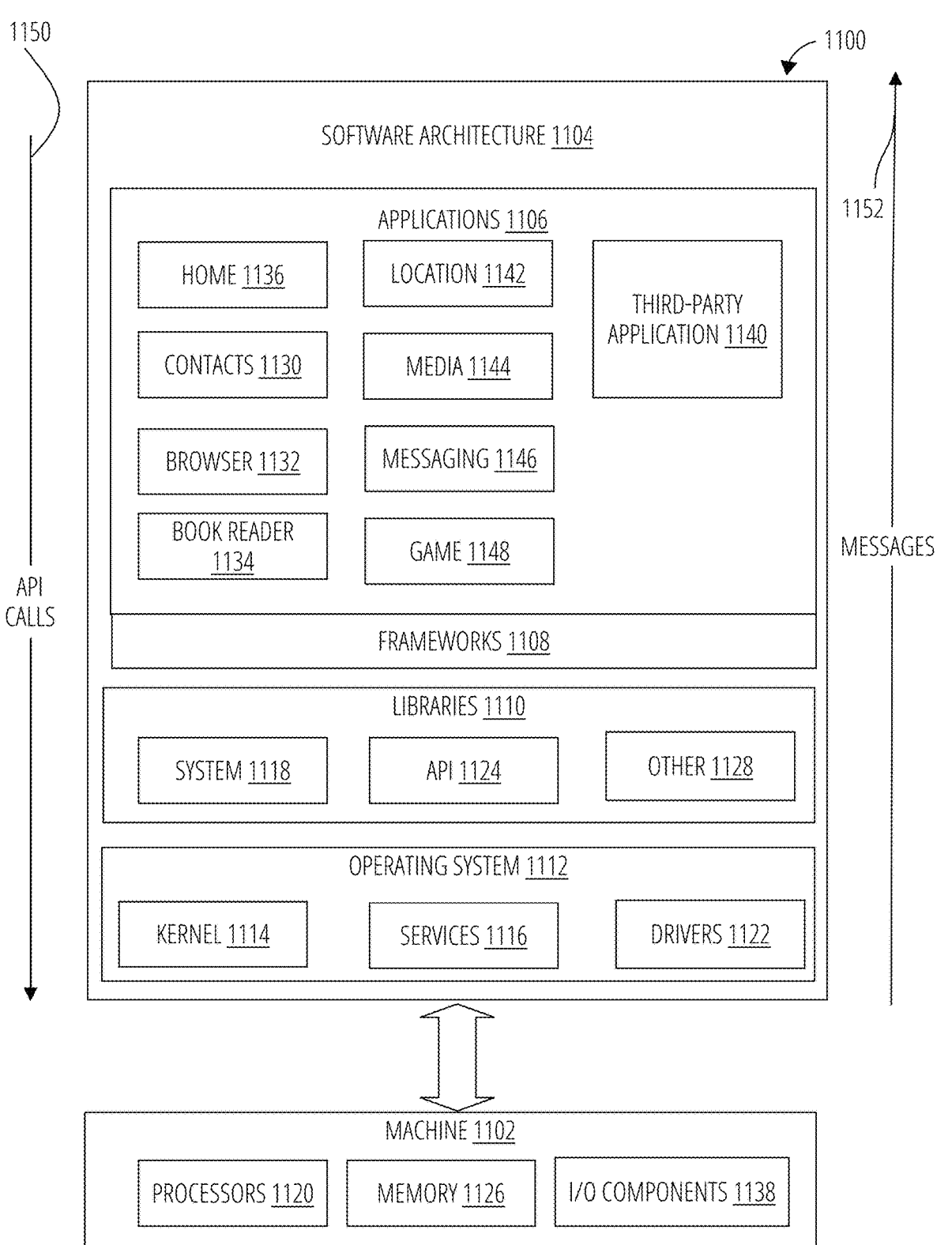
FIG. 11 is block diagram showing a software architecture within which the present disclosure may be implemented, according to an example embodiment.

FIG. 11 is a block diagram 1100 illustrating a software architecture 1104, which can be installed on any one or more of the devices described herein. The software architecture 1104 is supported by hardware such as a machine 1102 that includes Processors 1120, memory 1126, and I/O Components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, Processor management (e.g., scheduling), Component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1110 provide a low-level common infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a high-level common infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example embodiment, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1140 can invoke the API calls 1150 provided by the operating system 1112 to facilitate functionality described herein.

Figure 12:
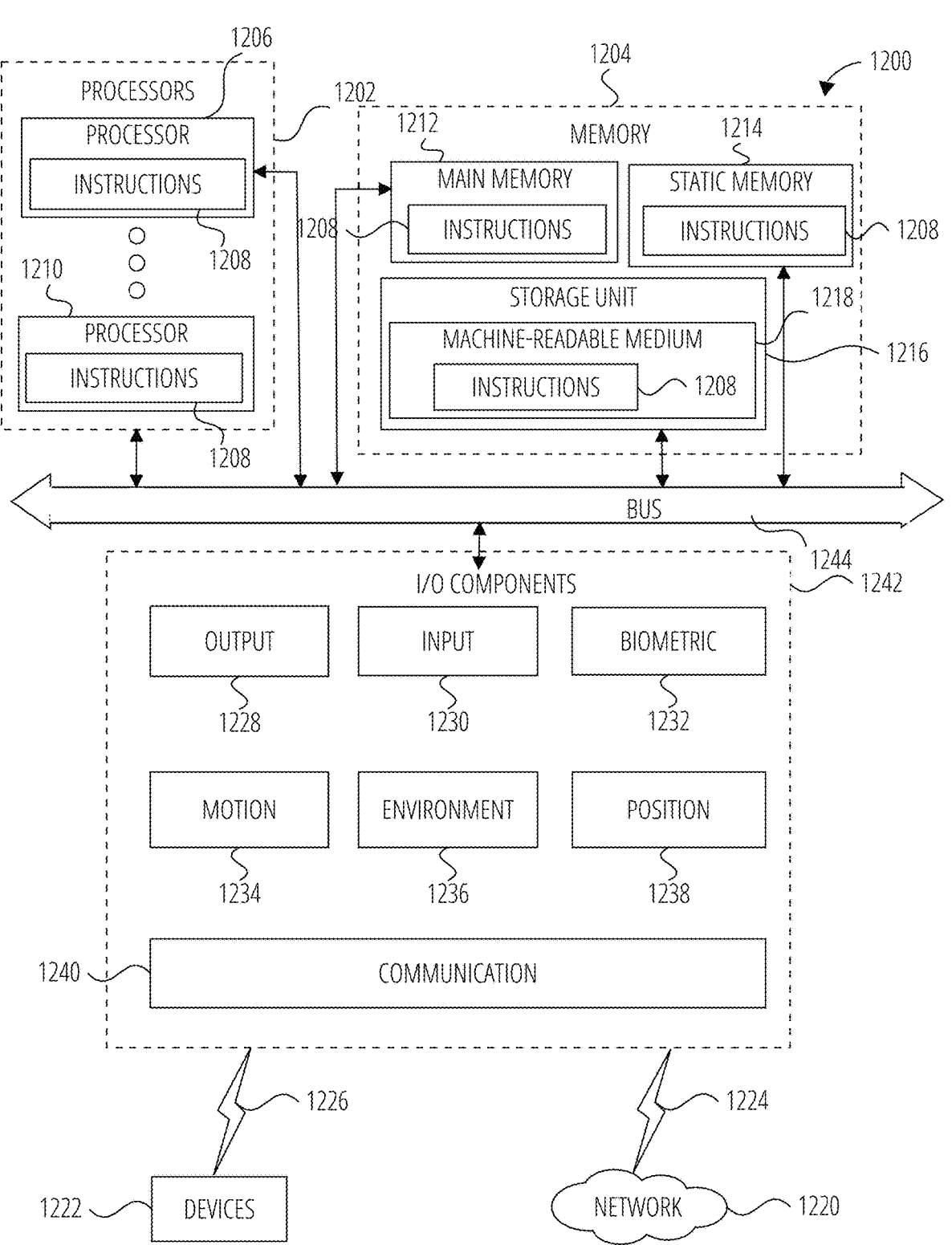
FIG. 12 is a diagrammatic representation of a machine in the form of a computer system within which a set of instructions may be executed for causing the machine to perform any one or more of the methodologies discussed herein, according to an example embodiment.

FIG. 12 is a diagrammatic representation of the machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein.

The machine 1200 may include Processors 1202, memory 1204, and I/O Components 1242, which may be configured to communicate with each other via a bus 1244. In an example embodiment, the Processors 1202 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1206 and a Processor 1210 that execute the instructions 1208. The term "Processor" is intended to include multi-core Processors that may comprise two or more independent Processors (sometimes referred to as "cores") that may execute instructions contemporaneously. Although FIG. 12 shows multiple Processors 1202, the machine 1200 may include a single Processor with a single core, a single Processor with multiple cores (e.g., a multi-core Processor), multiple Processors with a single core, multiple Processors with multiples cores, or any combination thereof.

The memory 1204 includes a main memory 1212, a static memory 1214, and a storage unit 1216, both accessible to the Processors 1202 via the bus 1244. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the Processors 1202 (e.g., within the Processor's cache memory), or any suitable combination thereof, during execution thereof by the machine 1200.

The I/O Components 1242 may include a wide variety of Components to receive input, provide output, produce output, transmit information, exchange information, capture measurements, and so on. The specific I/O Components 1242 that are included in a particular machine will depend on the type of machine. For example, portable machines such as mobile phones may include a touch input device or other such input mechanisms, while a headless server machine will likely not include such a touch input device. It will be appreciated that the I/O Components 1242 may include many other Components that are not shown in FIG. 12. In various example embodiments, the I/O Components 1242 may include output Components 1228 and input Components 1230. The output Components 1228 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1230 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1242 may include biometric Components 1232, motion Components 1234, environmental Components 1236, or position Components 1238, among a wide array of other Components. For example, the biometric Components 1232 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1234 include acceleration sensor Components (e.g., accelerometer), gravitation sensor Components, rotation sensor Components (e.g., gyroscope), and so forth. The environmental Components 1236 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1238 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1242 further include communication Components 1240 operable to couple the machine 1200 to a network 1220 or devices 1222 via a coupling 1224 and a coupling 1226, respectively. For example, the communication Components 1240 may include a network interface Component or another suitable device to interface with the network 1220. In further examples, the communication Components 1240 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 1222 may be another machine or any of a wide variety of peripheral devices (e.g., a peripheral device coupled via a USB).

Moreover, the communication Components 1240 may detect identifiers or include Components operable to detect identifiers. For example, the communication Components 1240 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1240, such as location via Internet Protocol (IP) geolocation, location via Wi-Fi® signal triangulation, location via detecting an NFC beacon signal that may indicate a particular location, and so forth.

The various memories (e.g., memory 1204, main memory 1212, static memory 1214, and/or memory of the Processors 1202) and/or storage unit 1216 may store one or more sets of instructions and data structures (e.g., software) embodying or used by any one or more of the methodologies or functions described herein. These instructions (e.g., the instructions 1208), when executed by Processors 1202, cause various operations to implement the disclosed embodiments.

The instructions 1208 may be transmitted or received over the network 1220, using a transmission medium, via a network interface device (e.g., a network interface Component included in the communication Components 1240) and using any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

EXAMPLES

Some embodiments are described as numbered examples (Example 1, 2, 3, etc.). These are provided as examples only and do not limit the technology disclosed herein.

Example 1 is a computer-implemented method comprising: accessing virtual private cloud flow logs of network traffic data originating from a virtual private cloud; generating filtered flow logs by filtering the virtual private cloud flow logs; extracting features based on a plurality of attributes from the filtered flow logs; training one or more machine learning models based on the features; applying the one or more machine learning models to the network traffic data to identify potential beacons; generating an alert notification that identifies the potential beacons; and communicating the alert notification to an alerting system.

In Example 2, the subject matter of Example 1 includes, wherein training the one or more machine learning models further comprises: training a virtual private cloud machine learning model for each virtual private cloud of a plurality of virtual private clouds; training an account machine learning model for each account of the virtual private cloud; and training a resource machine learning model for each resource of an account of the virtual private cloud.

In Example 3, the subject matter of Examples 1-2 includes, scoring and ranking the potential beacons based on past occurrences and time decay weight.

In Example 4, the subject matter of Example 3 includes, wherein the scoring and ranking of the potential beacons are based on one or more of: frequency, regularity, duration, size, content, encryption status, destination domain reputation, or source device behavior.

In Example 5, the subject matter of Examples 1-4 includes, receiving user feedback in response to communicating the alert notification to the alerting system; and re-training the one or more machine learning models based on the user feedback.

In Example 6, the subject matter of Examples 1-5 includes, receiving user feedback in response to communicating the alert notification to the alerting system; identifying a first machine learning model of the one or more machine learning models based on the alert notification and the user feedback; and re-training the first machine learning model based on the user feedback.

In Example 7, the subject matter of Examples 1-6 includes, causing a display of the alert notification with a graphical user interface that allows a user to filter, sort, search, or export alerts.

In Example 8, the subject matter of Examples 1-7 includes, wherein the network traffic data identifies a combination of source IP addresses, destination IP addresses, ports, protocols, payloads, timestamps, and intervals.

In Example 9, the subject matter of Examples 1-8 includes, wherein the plurality of attributes includes a combination of a communication duration, time between communications, transferred data size, and a number of packets.

In Example 10, the subject matter of Examples 1-9 includes, wherein the one or more machine learning models comprises at least one of isolating anomalies from n-dimensional space, Macbeth vector search, enclosing inliers, or auto-encoder.

In Example 11, the subject matter of Examples 1-10 includes, wherein the one or more machine learning models are trained on labeled network traffic data that includes known examples of malicious and benign beacons.

In Example 12, the subject matter of Examples 1-11 includes, the one or more machine learning models include one or more of: classification models, clustering models, anomaly detection models, or regression models.

In Example 13, the subject matter of Examples 1-12 includes, wherein the virtual private cloud flow logs include a plurality of flow logs, each flow log corresponding to a virtual private cloud account.

In Example 14, the subject matter of Example 13 includes, wherein the virtual private cloud account operates a plurality of services.

In Example 15, the subject matter of Example 14 includes, wherein each machine learning models of the one or more machine learning models correspond to a service from the plurality of services.

In Example 16, the subject matter of Examples 1-15 includes, wherein the alert notification comprises information about a source device, a destination host, beacon characteristics, and recommended actions.

Example 17 is a computing apparatus comprising: a processor; and a memory storing instructions that, when executed by the processor, configure the apparatus to: access virtual private cloud flow logs of network traffic data originating from a virtual private cloud; generate filtered flow logs by filtering the virtual private cloud flow logs; extract features based on a plurality of attributes from the filtered flow logs; train one or more machine learning models based on the features; apply the one or more machine learning models to the network traffic data to identify potential beacons; generate an alert notification that identifies the potential beacons; and communicate the alert notification to an alerting system.

In Example 18, the subject matter of Example 17 includes, wherein training the one or more machine learning models further comprises: train a virtual private cloud machine learning model for each virtual private cloud of a plurality of virtual private clouds; train an account machine learning model for each account of the virtual private cloud; and train a resource machine learning model for each resource of an account of the virtual private cloud.

In Example 19, the subject matter of Examples 17-18 includes, wherein the instructions further configure the apparatus to: score and rank the potential beacons based on past occurrences and time decay weight.

Example 20 is a non-transitory computer-readable storage medium, the computer-readable storage medium including instructions that when executed by a computer, cause the computer to: access virtual private cloud flow logs of network traffic data originating from a virtual private cloud; generate filtered flow logs by filtering the virtual private cloud flow logs; extract features based on a plurality of attributes from the filtered flow logs; train one or more machine learning models based on the features; apply the one or more machine learning models to the network traffic data to identify potential beacons; generate an alert notification that identifies the potential beacons; and communicate the alert notification to an alerting system.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A computer-implemented method comprising:

accessing virtual private cloud flow logs of network traffic data originating from a virtual private cloud;

generating filtered flow logs by filtering the virtual private cloud flow logs;

extracting features based on a plurality of attributes from the filtered flow logs;

training one or more machine learning models based on the features, the training of the one or more machine learning models comprising at least one of:

training a virtual private cloud machine learning model for each virtual private cloud of a plurality of virtual private clouds;

training an account machine learning model for each account of the virtual private cloud; or training a resource machine learning model for each resource of an account of the virtual private cloud;

applying the one or more machine learning models to the network traffic data to identify potential beacons;

generating an alert notification that identifies the potential beacons; and communicating the alert notification to an alerting system.

2. The computer-implemented method of claim 1, further comprising:

scoring and ranking the potential beacons based on past occurrences and time decay weight.

3. The computer-implemented method of claim 2, wherein the scoring and ranking of the potential beacons are based on one or more of: frequency, regularity, duration, size, content, encryption status, destination domain reputation, or source device behavior.

4. The computer-implemented method of claim 1, further comprising:

receiving user feedback in response to communicating the alert notification to the alerting system; and re-training the one or more machine learning models based on the user feedback.

5. The computer-implemented method of claim 1, further comprising:

receiving user feedback in response to communicating the alert notification to the alerting system;

identifying a first machine learning model of the one or more machine learning models based on the alert notification and the user feedback; and re-training the first machine learning model based on the user feedback.

6. The computer-implemented method of claim 1, further comprising:

causing a display of the alert notification with a graphical user interface that allows a user to filter, sort, search, or export alerts.

7. The computer-implemented method of claim 1, wherein the network traffic data identifies a combination of source IP addresses, destination IP addresses, ports, protocols, payloads, timestamps, and intervals.

8. The computer-implemented method of claim 1, wherein the plurality of attributes includes a combination of a communication duration, time between communications, transferred data size, and a number of packets.

9. The computer-implemented method of claim 1, wherein the one or more machine learning models comprises at least one of isolating anomalies from n-dimensional space, Macbeth vector search, enclosing inliers, or auto-encoder.

10. The computer-implemented method of claim 1, wherein the one or more machine learning models are trained on labeled network traffic data that includes known examples of malicious and benign beacons.

11. The computer-implemented method of claim 1, the one or more machine learning models include one or more of: classification models, clustering models, anomaly detection models, or regression models.

12. The computer-implemented method of claim 1, wherein the virtual private cloud flow logs include a plurality of flow logs, each flow log corresponding to a virtual private cloud account.

13. The computer-implemented method of claim 12, wherein the virtual private cloud account operates a plurality of services.

14. The computer-implemented method of claim 13, wherein each machine learning models of the one or more machine learning models correspond to a service from the plurality of services.

15. The computer-implemented method of claim 1, wherein the alert notification comprises information about a source device, a destination host, beacon characteristics, and recommended actions.

16. A computing apparatus comprising:

a processor; and a memory storing instructions that, when executed by the processor, configure the apparatus to perform operations comprising:

accessing virtual private cloud flow logs of network traffic data originating from a virtual private cloud;

generating filtered flow logs by filtering the virtual private cloud flow logs;

extracting features based on a plurality of attributes from the filtered flow logs;

training one or more machine learning models based on the features, the training of the one or more machine learning models comprising at least one of:

training a virtual private cloud machine learning model for each virtual private cloud of a plurality of virtual private clouds;

training an account machine learning model for each account of the virtual private cloud; or training a resource machine learning model for each resource of an account of the virtual private cloud;

applying the one or more machine learning models to the network traffic data to identify potential beacons;

generating an alert notification that identifies the potential beacons; and communicating the alert notification to an alerting system.

17. The computing apparatus of claim 16, wherein the operations further comprise:

scoring and ranking the potential beacons based on past occurrences and time decay weight.

18. A non-transitory computer-readable storage medium, the computer-readable storage medium including instructions that when executed by a computer, cause the computer to perform operations comprising:

accessing virtual private cloud flow logs of network traffic data originating from a virtual private cloud;

generating filtered flow logs by filtering the virtual private cloud flow logs;

extracting features based on a plurality of attributes from the filtered flow logs;

training one or more machine learning models based on the features, the training of the one or more machine learning models comprising at least one of:

training a virtual private cloud machine learning model for each virtual private cloud of a plurality of virtual private clouds;

training an account machine learning model for each account of the virtual private cloud; or training a resource machine learning model for each resource of an account of the virtual private cloud;

applying the one or more machine learning models to the network traffic data to identify potential beacons;

generating an alert notification that identifies the potential beacons; and communicating the alert notification to an alerting system.

19. The non-transitory computer-readable storage medium of claim 18, wherein the operations further comprise scoring and ranking the potential beacons based on past occurrences and time decay weight.

20. The non-transitory computer-readable storage medium of claim 18, wherein the operations further comprise:

receiving user feedback in response to communicating the alert notification to the alerting system; and re-training the one or more machine learning models based on the user feedback.

\* \* \* \* \*